(12) United States Patent
Vuppala et al.

(10) Patent No.: US 11,087,279 B2
(45) Date of Patent: Aug. 10, 2021

(54) DATABASE CODE EXECUTION

(71) Applicant: SAP SE, Walldorf (DE)

(72) Inventors: Rajendra Vuppala, Dublin, CA (US); Avinash Permude, Bangalore (IN); Kiran Prashanth Kulkarni, Bangalore (IN); Rahul Seshagiri Srivatsa, Mysore (IN); Ketan Bengali, Sunnyvale, CA (US)

(73) Assignee: SAP SE, Walldorf (DE)

( * ) Notice: Subject to any disclaimer, the term of this patent is extended or adjusted under 35 U.S.C. 154(b) by 357 days.

(21) Appl. No.: 16/123,432

(22) Filed: Sep. 6, 2018

(65) Prior Publication Data

US 2020/0082336 A1 Mar. 12, 2020

(51) Int. Cl.
*G06Q 10/08* (2012.01)
*G06F 16/27* (2019.01)
*G06F 16/23* (2019.01)

(52) U.S. Cl.
CPC ..... *G06Q 10/0875* (2013.01); *G06F 16/2365* (2019.01); *G06F 16/27* (2019.01)

(58) Field of Classification Search
CPC . G06Q 10/0875; G06F 16/27; G06F 16/2365; G06F 16/25; G06F 16/23
See application file for complete search history.

(56) References Cited

U.S. PATENT DOCUMENTS

| | | | |
|---|---|---|---|
| 2002/0178077 A1* | 11/2002 | Katz | G06Q 10/10 705/7.36 |
| 2015/0046363 A1* | 2/2015 | McNamara | G06Q 10/0635 705/333 |
| 2015/0269497 A1* | 9/2015 | Barnett | G06Q 20/382 705/51 |
| 2015/0271150 A1* | 9/2015 | Barnett | G06Q 20/4014 713/171 |
| 2017/0236084 A1* | 8/2017 | Sullivan | G06Q 10/06316 705/7.26 |
| 2017/0330121 A1* | 11/2017 | Sullivan | G06Q 40/10 |
| 2018/0005186 A1* | 1/2018 | Hunn | G06F 40/103 |
| 2018/0096175 A1* | 4/2018 | Schmeling | G06Q 10/08 |
| 2018/0101842 A1* | 4/2018 | Ventura | G06F 16/178 |
| 2018/0157825 A1* | 6/2018 | Eksten | H04L 9/3239 |
| 2018/0158003 A1* | 6/2018 | Ghosh | G06Q 10/10 |
| 2018/0176301 A1* | 6/2018 | Rosier | H04L 67/2823 |
| 2018/0211202 A1* | 7/2018 | Ynion, Jr. | G06Q 20/12 |
| 2018/0225345 A1* | 8/2018 | Gilder | G06F 16/273 |

* cited by examiner

*Primary Examiner* — Peter Ludwig
*Assistant Examiner* — Michael Jared Walker
(74) *Attorney, Agent, or Firm* — Sterne, Kessler, Goldstein & Fox P.L.L.C.

(57) ABSTRACT

Disclosed herein are system, computer-implemented method, and computer program product (computer-readable storage medium) embodiments for implementing bill-of-materials (BOM) lifecycle management. An embodiment operates by creating a first database entry. The first database entry may also include a first executable code instance and list of items, which may include at least part of a BOM. Additionally, a second database entry may be created and may include a second executable code instance. Based on execution of the first code instance and the second code instance, at least one processor may automatically perform further processing.

20 Claims, 5 Drawing Sheets

DATABASE CODE EXECUTION

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for implementing database code execution, such as of executable code within a database. Example applications may include BOM lifecycle management via distributed ledger. More specifically, in some embodiments, the distributed ledger may involve smart contracts and/or blockchain technology, for example, with varying degrees of decentralization and shared control.

For some non-limiting examples referenced in this detailed description, shared ledgers or distributed ledgers, including blockchain technology, may be included as non-limiting use cases. Blockchains may be, for example and without limitation, permissionless blockchains, permissioned blockchains (consortium blockchains), or any combination thereof, including hybrid blockchains. Any method(s), function(s), mechanism(s), model(s), or protocol(s) may be used for validating related transactions, identities of parties, etc., to establish consensus. Some examples of consensus validation models may include proof-of-stake, proof-of-space, proof-of-authority, and proof-of-work, including reusable proof-of-work.

Consensus may be determined by distributed consensus, decentralized consensus, or consortium-based consensus, to name a few examples. Any similar form of reliable, fault-tolerant, and consistent validation of data and results across multi-agent systems may be used. In addition to direct validation of consensus, static contracts on a distributed ledger, fully or partially self-executing smart contracts, operationalized contracts, or smart bonds, to name a few non-limiting examples, may also leverage blockchain technology and benefit from enhanced encryption techniques described herein, for confidentiality and for security.

Figure 1:
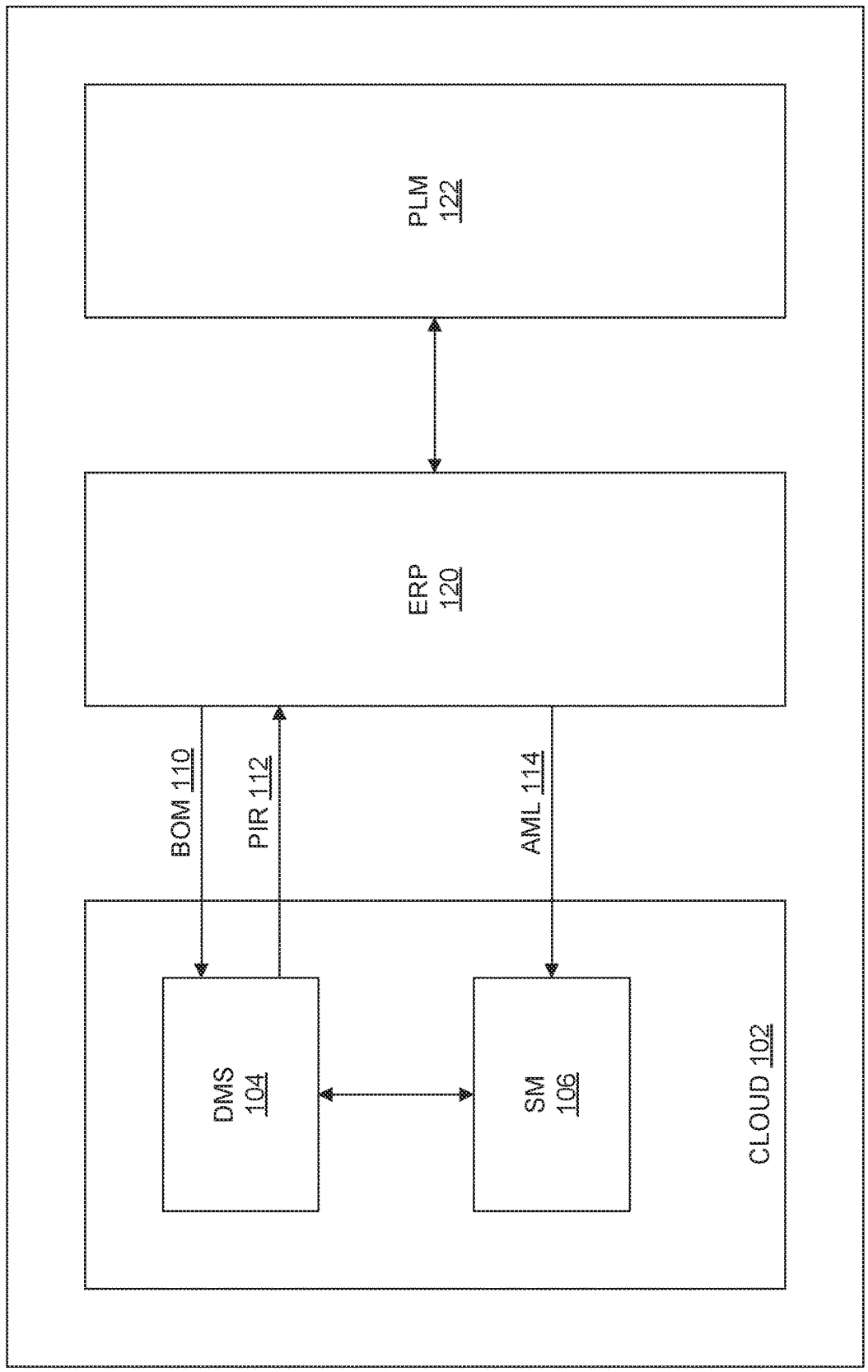
FIG. 1 is a diagram of a product lifecycle management system with enterprise resource planning and cloud-based solutions, according to some embodiments.

One non-limiting example of a particular product lifecycle management (PLM) system that may benefit from the enhanced techniques described herein is depicted in the example of FIG. 1. An accompanying description of FIG. 1 follows in the paragraphs below.

FIG. 1 is a diagram of an example system 100 that may include applications for PLM 122, according to some embodiments. Although the term PLM is used in this particular embodiment, system 100 need not be limited to PLM per se-similar applications may be used additionally or alternatively to PLM 122 in its place within system 100, e.g., manufacturing resource planning and material requirements planning, supply chain management, customer relationship management (CRM), and business intelligence (BI), to name a few non-limiting examples. Further system components, including any number of modules and/or applications, may interact with PLM 122 as shown. Specifically, shown here is at least one enterprise resource planning (ERP) module ERP 120.

In some embodiments, ERP 120 and PLM 122 may be integrated as the same element, or may alternatively be separate solutions from multiple providers, for example. Although FIG. 1 shows one instance for each of ERP 120 and PLM 122, any number of solutions or applications may exist corresponding to ERP and PLM or related components in a given system such as system 100 for any given embodiment.

In further embodiments, ERP 120 and/or PLM 122 may interact with cloud-based computing resources or services, for example, such as may include a direct materials sourcing (DMS) 104 component and a supply management (SM) 106 component, hosted in a cloud 102 infrastructure, as shown in FIG. 1. The elements shown in FIG. 1 depict an example embodiment for illustrative purposes and are not intended to represent specific requirements or limitations for other comparable systems. Cloud 102 may be, in some examples, third-party infrastructure operated remotely, whereas in other examples, cloud 102 may represent comparable infrastructure hosted locally on premises by the same party operating ERP 120 and/or PLM 122.

As shown in FIG. 1, information may be communicated between ERP 120 (and, in turn, PLM 122), cloud 102, and cloud-based components such as DMS 104 and SM 106, for example. In the embodiment shown, DMS 104 may communicate at least one purchase information report (PIR) 112 to ERP 120. PIR 112 may include, for example, price quotes (not shown) for certain raw materials, manufactured goods, sourcing services, or manufacturing services, in some embodiments. PIR 112 may be communicated to ERP 120 upon a triggering event when a user forms a sourcing agreement by accepting a given price quote for specific items (goods or services), in one non-limiting example.

Separately, also shown in FIG. 1, ERP 120 may communicate a bill of materials (BOM) 110 or an approved manufacturer list (AML) 114 to resources or services in cloud 102, such as DMS 104 or SM 106, respectively. BOM 110 and/or AML 114 may, in some embodiments, have originated from PLM 122 to be relayed via ERP 120. In other embodiments, PLM 122 may communicate BOM 110 or AML 114 directly to the DMS 104 or SM 106 in cloud 102 as needed. Additionally or alternatively, BOM 110 or AML 114 may be taken from user input (manual upload) or may be supplied by other local or remote first- or third-party systems, manually or automatically, including programmatically, such as via at least one application programming interface (API). Communications may flow in any direction—PIR 112 may be communicated to ERP 120, and in turn copied or relayed to PLM 122, in some embodiments. Directional flow may be reversed, in other embodiments.

Systems, such as system 100 as depicted in FIG. 1, may allow, e.g., sourcing solutions to manage advanced requirements of some parties for their own DMS needs. This may result in a closed-loop, source-to-contract solution for managing sourcing and suppliers across various categories and levels of spend, and may further integrate new BOMs from PLM systems, including through sourcing, contract management, and manufacturing execution integration. These types of solutions then may depend on relationships between product design teams and sourcing teams within an organization, as well as across third-party suppliers, purchasers, and any intermediaries-specifically, such relationships may range from close integration of sharing the same resources and tools among trusted and untrusted parties, or independent fragmentation of each party having separate resources and tools that may be incompatible with those of the other involved parties.

Still, having separate resources may hinder tracking of items common to the product lifecycle, while sharing among untrusted parties may compromise the integrity of the data or resources shared. Along these lines, within the above workflow framework, specific advantages and disadvantages may be known. However, the overall workflow may be further improved by altering the framework, redefining relationships between parties and services, as well as how information may be communicated and stored, so as to enhance consistency, reliability, and security, among other aspects of ERP and PLM systems, according to enhanced techniques further described here.

Figure 2:
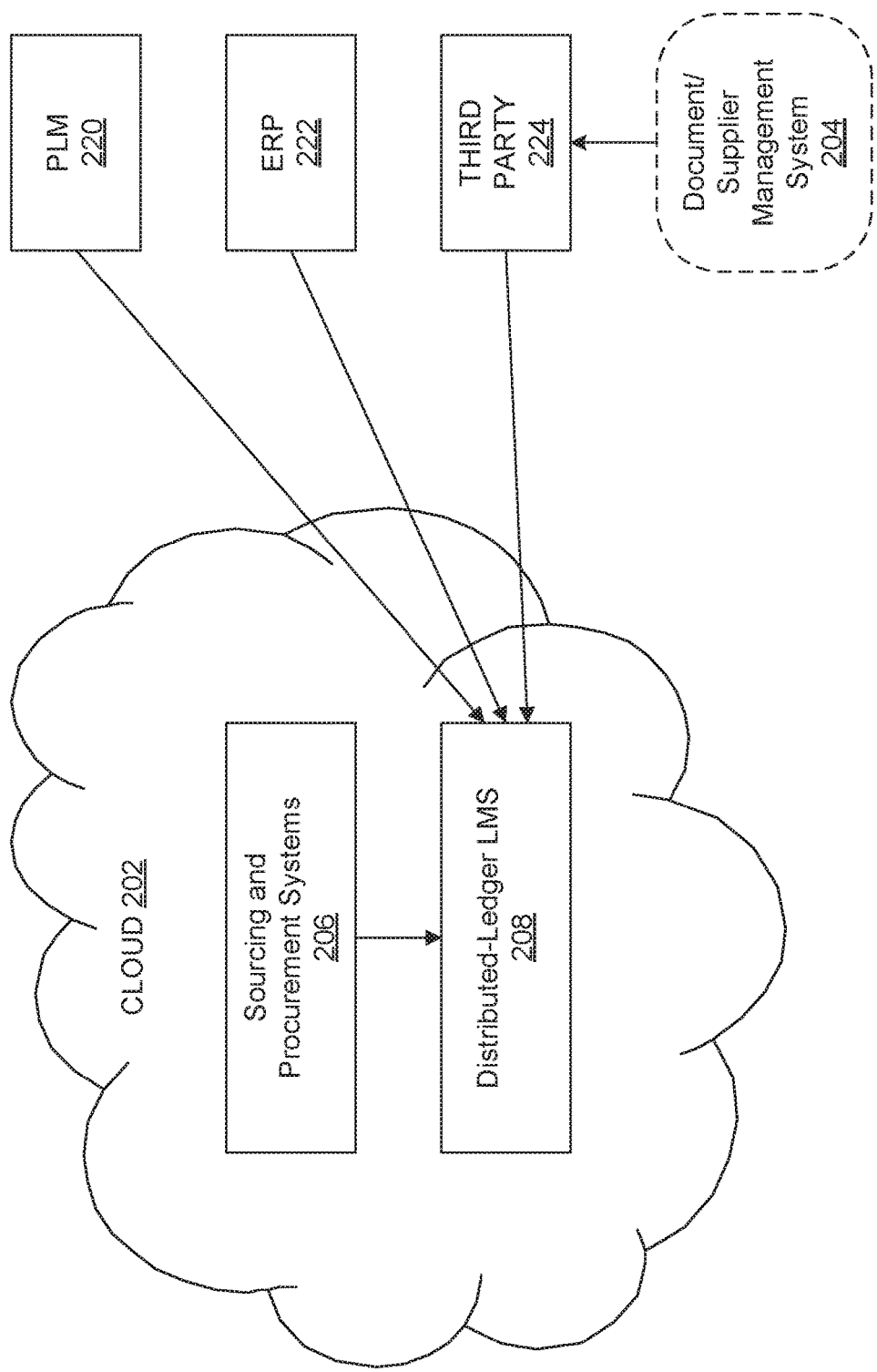
FIG. 2 is a diagram illustrating a streamlined cloud-based solution using a distributed ledger, according to some embodiments.

FIG. 2 shows a streamlined cloud-based solution using a distributed ledger, according to some embodiments. At a high level, this solution may provide a framework that supports distributed-ledger technology, including blockchain technology, in some embodiments, that may be configured to store and/or execute code, such as at least part of a smart contract.

One benefit of the distributed-ledger-based approach shown in FIG. 2 is that separate or disparate systems, e.g., any of PLM 220, ERP 222, and third-party 224 systems (such as document/supplier management system 204), may be configured to communicate directly with the distributed ledger (LMS) 208. This avoids more complicated arrangements of relaying communications through other applications or parties, which may be untrusted, while maintaining ability to track, e.g., BOMs, at least in some use cases.

This distributed-ledger LMS 208 may comprise information from other entities hosted in cloud 202, such as sourcing and procurement systems 206, in some embodiments. An additional strength of this configuration is by allowing other disparate systems, including third parties, to access at least some of the same information that may otherwise be incompatibly formatted or otherwise inaccessible via cloud-based resources or services. A further result of this more efficient tracking of products and components in a supply chain generally or for specific product lifecycle management.

A further advantage, in an example where the distributed ledger may be a blockchain, is that any information or smart contracts/code entered may not be changed, such as by unauthorized or untrusted parties. This aspect of relative immutability of contents allows for consistency, reliability, and security with respect to any data stored therein and/or retrieved therefrom.

This benefit may be derived, at least in part, because the distributed ledger is distributed (decentralized) to an extent. At the same time, the positive effect of increased accessibility of data and enforceability of contracts may be considered as reliable as having a central but trusted authority to maintain integrity, not only of data but also of specific agreements, even if other relevant components are in cloud 202 and otherwise not trusted. A more detailed focus on the inner-workings of this distributed-ledger solution for tracking and smart execution in PLM systems with BOMs may be found in FIG. 3 below.

Specific relationships of parties within a supply chain may be defined, at least in part, as follows: an original equipment manufacturer (OEM) may manufacture assemblies, which may be defined as items made from multiple other items. To make these assemblies, OEMs may purchase the multiple other items from Tier-1 suppliers. To the extent that the items supplied by Tier-1 suppliers are not raw materials or services, but rather subassemblies of the OEMs' assemblies, the Tier-1 suppliers may also, in turn, need to buy smaller components from Tier-2 suppliers, and so on.

An example of these relationships may be an automotive OEM, which makes finished automobiles as assemblies. So that the finished automobiles may be equipped with standard seats, the automotive OEM may buy ready-made seats from a Tier-1 supplier. However, the seats may be subassemblies, requiring their own assembling. For example, Tier-1 supplier may not manufacture its own upholstery for the seats-rather, in this example, the Tier-1 supplier in turn may source the upholstery from a Tier-2 supplier, and so on down the supply chain to raw materials, with any lower-tier supplier(s), for example.

A problem that may arise in this chain spanning at least two tiers is when OEMs may target certain prices, but lower-tier suppliers may raise prices. Other problems may involve an OEM meeting demand for sales, while lower-tier suppliers do not have enough inventory of their components, including inventory shortages, as a result of overselling certain inventory or product/component stock. These shortages may be referred to as stockouts, further referencing shortages of assemblies, subassemblies, components, or raw materials, for example. Inventory may refer to finished items in stock at a given vendor (supplier, OEM, etc.)

Due to the dependency relationships found in the examples described above, it is further likely that any problems described above may disrupt supply chain execution farther along the chain. Supply chain execution here may be defined as short-term execution (as opposed to longer-term planning) process(es) happening in a supply chain, for example, executing purchase orders, advancing shipping notices, using inventory, and the like. As a further example, if an OEM with narrow profit margins must buy its supplies at elevated costs that would unacceptably reduce or eliminate any profit margin, then the OEM's production may become unprofitable and inefficient. Similarly, if an OEM depends on a Tier-1 supplier, and that supplier runs out of inventory, such a stockout may halt OEM production altogether.

For these scenarios (and others), distributed-ledger-based PLM systems may be deployed and configured to store and execute code to enforce or maintain certain agreements and/or other parameters specified by certain users of such systems. As a result, manufacturers higher in the supply chain (e.g., OEMs, Tier-1 suppliers, etc.) may benefit from the added confidence that certain agreements will be enforced, even with unknown or untrusted third parties and in various jurisdictions in which legal or equitable remedies may be unfeasible or costly. This may be realized through a chain of conditionally-executing or self-executing code, including but not limited to smart contracts, chaincode, or similar concepts available, as further described below with respect to FIG. 3.

Figure 3:
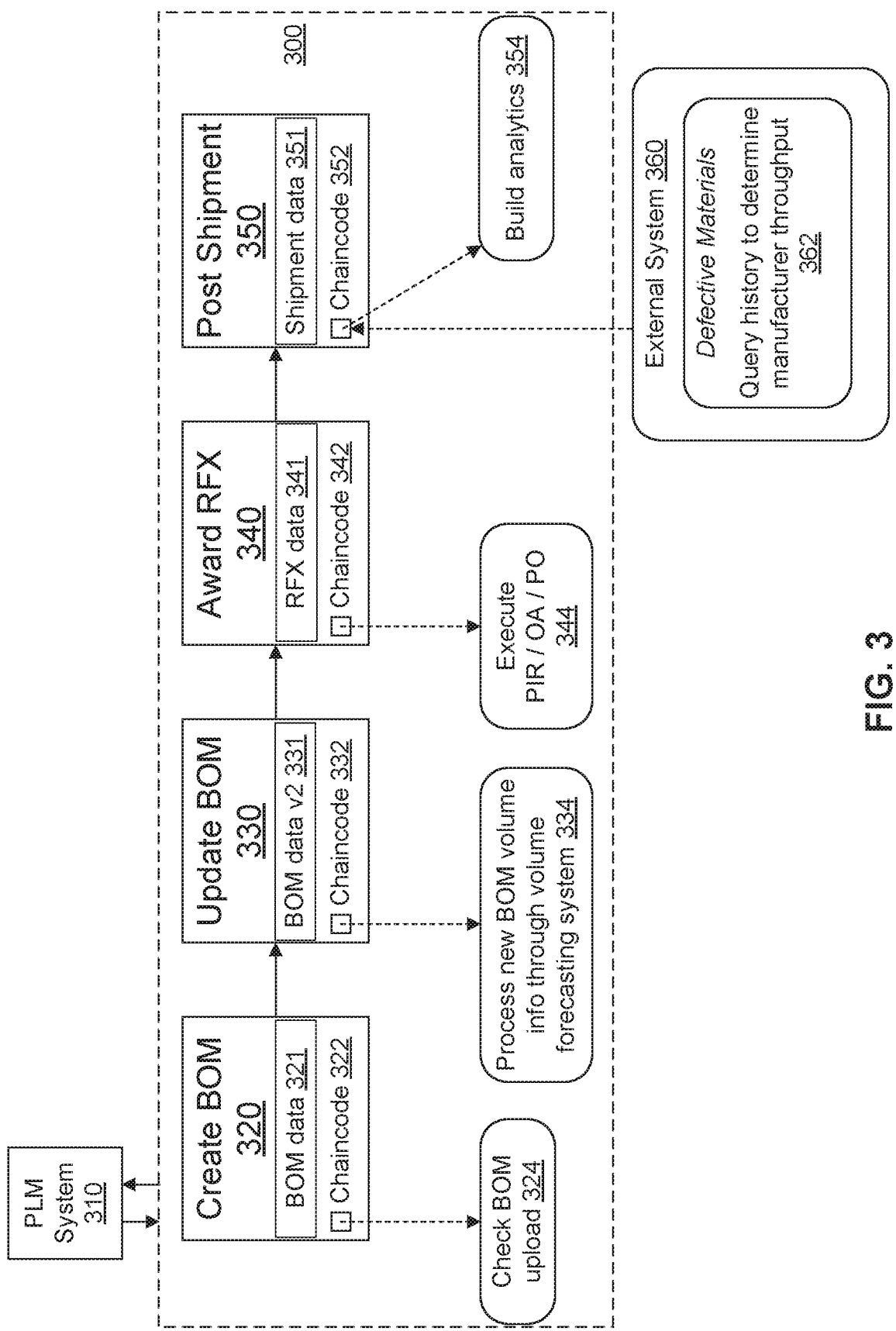
FIG. 3 is a diagram depicting tracking and smart execution, via distributed-ledger technology, within BOM lifecycle management for a given product or component, according to some embodiments.

FIG. 3 is a diagram depicting tracking and smart execution, via distributed-ledger technology, within BOM lifecycle management for a given product or component, according to some embodiments.

For context, product lifecycle management may, in some embodiments, include a series of stages, e.g., 1) create a product design in a PLM system, 2) push PLM system data to an ERP system as a BOM, 3) push ERP system data to cloud resources or services, 4) collect pricing information (pre- or post-negotiation) for materials in the BOM, 5) communicate PIRs to the ERP system with collected prices, 6) create purchase orders from PIRs in the ERP system, 7) send materials or subassemblies to contracted manufacturers from list of contracted manufacturers (or AML, in some use cases), 8) track shipments of materials or subassemblies across lower-tier manufacturers and OEMs, and/or 9) track shipments of assemblies (finished products) to retailers and/or end consumers, in a non-limiting example. Stages may be omitted or reordered, and other stages may be added, in some embodiments.

In order to ensure consistent, reliable, and secure management at any given stage of PLM, PLM requirements of any or all stages of PLM may be encoded as executable code in a distributed ledger, such as smart contracts or chaincodes in a blockchain, in some embodiments. In these contexts, executable code may be partially, fully, and/or conditionally self-executing. Such executable code may serve a role of automatic enforcement of existing agreements between or among parties in the supply chain, for example. If any agreement or expected action fails to complete on a given schedule, the PLM system may be configured to provide automatic notifications to any interested parties or trigger additional transactions.

The chaincode or smart contract executable code may be implemented using existing platforms and/or frameworks, including Hyperledger Fabric, Ethereum, Corda, any other distributed-ledger technology capable of chaincode or smart-contract execution, or any combination of the above, according to some embodiments. At any stage of PLM, an update may be pushed to a corresponding distributed ledger. In a case of blockchain technology, for example, new entries representing updates may be added to the distributed ledger and verified according to any applicable cryptographic protocol and consensus model.

Thus, the example depicted in FIG. 3 shows relevant blocks in a blockchain 300, accessible by PLM system 310 and at least one external system 360, according to an embodiment. Any other blocks may be present but are not shown, for purposes of illustrating the PLM example for a given product, in this case (specific product not shown). As also described with respect to FIGS. 1 and 2, at least one enterprise resource planning (ERP) system (not shown in FIG. 3) may be integrated with or separate from PLM. In embodiments where ERP system(s) may be separate from PLM system(s), the ERP system(s) may communicate information to and/or from blockchain 300, independently and/or on behalf of any PLM system(s) to which the ERP system(s) may be communicatively coupled.

For example, PLM system 310 may be configured to read and write from a distributed ledger, such as blockchain 300. When creating a BOM, PLM system 310 may generate a new record as an entry in the distributed ledger, such as block 320 of blockchain 300. In some embodiments, block 320 may contain BOM data 321, which may include metadata about the BOM and/or may contain the entire BOM or any part thereof.

In addition to data such as BOM data 321, block 320 may further include chaincode 322, as shown in this particular example of FIG. 3. This example is not intended to be limiting; in other embodiments, chaincode 322 may be implemented as a smart contract, smart agreement, executable or self-executing code, or other smart instrument, for example. Specifically, in block 320, chaincode may be configured (as shown at 324) to check a BOM uploaded to blockchain 300, such as from BOM data 321 of block 320. The check may, in some embodiments, include a validation for conformance with specific parameters, regulatory mandates, industry standards, etc. This check at 324 may further be configured to trigger other actions or transactions by execution of chaincode 322, for example.

PLM system 310 may update the BOM, creating a new record as an entry in the distributed ledger for the updated BOM at block 330. As with BOM data 321, another (updated) version of the BOM data may be stored as BOM data v2 331 in block 330, for example. As with chaincode 322 from block 320, chaincode 332 in block 330 may be configured to perform the same validations or other actions/transactions as chaincode 322 with respect to any new BOM entry. In some embodiments, updated BOM data may also cause BOM data (e.g., volume information, analytics, other metrics) to be processed via another system not directly communicating with blockchain 300 or participating in agreements or instruments of chaincode 332. This type of processing may also be applied to any new BOM data created or added to blockchain 300, such as in block 320, illustrating the versatility of blockchain 300 for PLM.

PLM system 310 (or another system with similar access to blockchain 300) may add block 340 to blockchain 300 upon an RFX award. RFX, in this example, may request any kind of request that may result in a contract being awarded to a specific party that may have submitted a bid in response to the request, e.g., request for tender (RFT), request for solution (RFS), request for quotation (RFQ), request for proposal (RFP), request for offer (RFO), etc. Other types of requests (invitations, expressions, calls, bids, etc.) may be represented in a similar fashion with this type of block.

RFX data may be included in block 340 as RFX data 341. RFX data may further include other terms and conditions accompanying the original RFX, or anything else agreed upon with an ensuing bid or counteroffer, for example. Some specific instances of this RFX data may include a purchase order (PO), a purchase information report (PIR), and/or an order agreement (OA), to name a few non-limiting examples. Once terms have been accepted by bidders, chaincode 342 may automatically determine winning bidder(s) or request(s) and automatically execute the terms agreed upon, per executable logic of chaincode 342 or any other related smart contract instruments or other executable agreements, in some embodiments. As with other chaincode examples described above, other actions or transactions may be triggered by chaincode 342, such as in response to RFX award or any incident execution of instruments. Bids and awards may be placed and decided through PLM system 310 or any other external system.

Upon shipping materials, subassemblies, assemblies, or any other product or fulfillment of service (commencement, in-progress, completion, etc.), PLM system 310 may post a shipment with a corresponding record as a distributed-ledger entry, such as block 350 in blockchain 300. Shipment data 351 may be included, such as for other systems to track ongoing status of shipments. Tracking may be done separately, so as to avoid additional blockchain traffic or distributed-ledger entries, although other embodiments may be configured to update and/or add distributed-ledger entries more frequently, such as with any change in shipment status.

Chaincode 352 in block 350 may be further configured to generate or build analytics regarding shipment. The analytics may track not only the shipment of shipment data 351, but also may include other current and/or historical shipment data, for example. Additionally, external system 360 may interact with chaincode 352, such as to provide such historical data, automatically or by query via chaincode 352, to furnish additional information that may be relevant to analytics. Such historical data may include, e.g., manufacturer throughput, defect rates, capacity, etc.

Shipment tracking may additionally include batched or real-time processing of logistical data, including location scans of barcodes, radio-frequency identification (RFID) tags, global positioning system (GPS) signal readings (and/or similar or related technology), mobile devices including Internet-of-Things (IoT) devices, or any combination thereof, for example. In some embodiments, external trackers for logistical data, including external systems and/or mobile/IoT devices themselves, may additionally access blockchain 300 for tracking and/or updating relevant information for shipment tracking and other PLM data.

Such shipment tracking may be performed by a logistical system, separately from or integrated with either or both of PLM system or ERP system. Such a logistical system may automatically update or add distributed-ledger entries in response to logistical events, such as shipping status updates, for example, which may be received at a logistical system (or PLM system or ERP system) when generated from a mobile/IoT device automatically in response to an event such as a location scan.

Depending on implementation of a given distributed ledger or blockchain, such as blockchain 300, consensus validation may limit or otherwise determine how entries or blocks may be added and whether blocks may be modified. Generally, blockchain technology may employ distributed ledger or database technology together with cryptographic techniques to ensure immutability of data in blockchains. In such cases, updates may take the form of new blocks rather than any attempt at modification of existing blocks, for example. However, for purposes of this disclosure, any mention of updating blockchain entries or distributed ledger entries may be interpreted as adding new or updated information to a distributed ledger, including blockchain, whether or not in may also involve, or be feasible to perform, any modifications to any existing entries.

Additionally, other blocks not shown in FIG. 3 may come before or after those shown in FIG. 3, may be interspersed with those shown in FIG. 3, and/or may be (at least temporarily) forked from blockchain 300 shown in FIG. 3. For illustrative purposes, FIG. 3 shows only blocks 320, 330, 340, and 350, but this example is not intended to be limiting. Any additional benefits of these techniques may also be apparent to persons having ordinary skill in the art.

Figure 4:
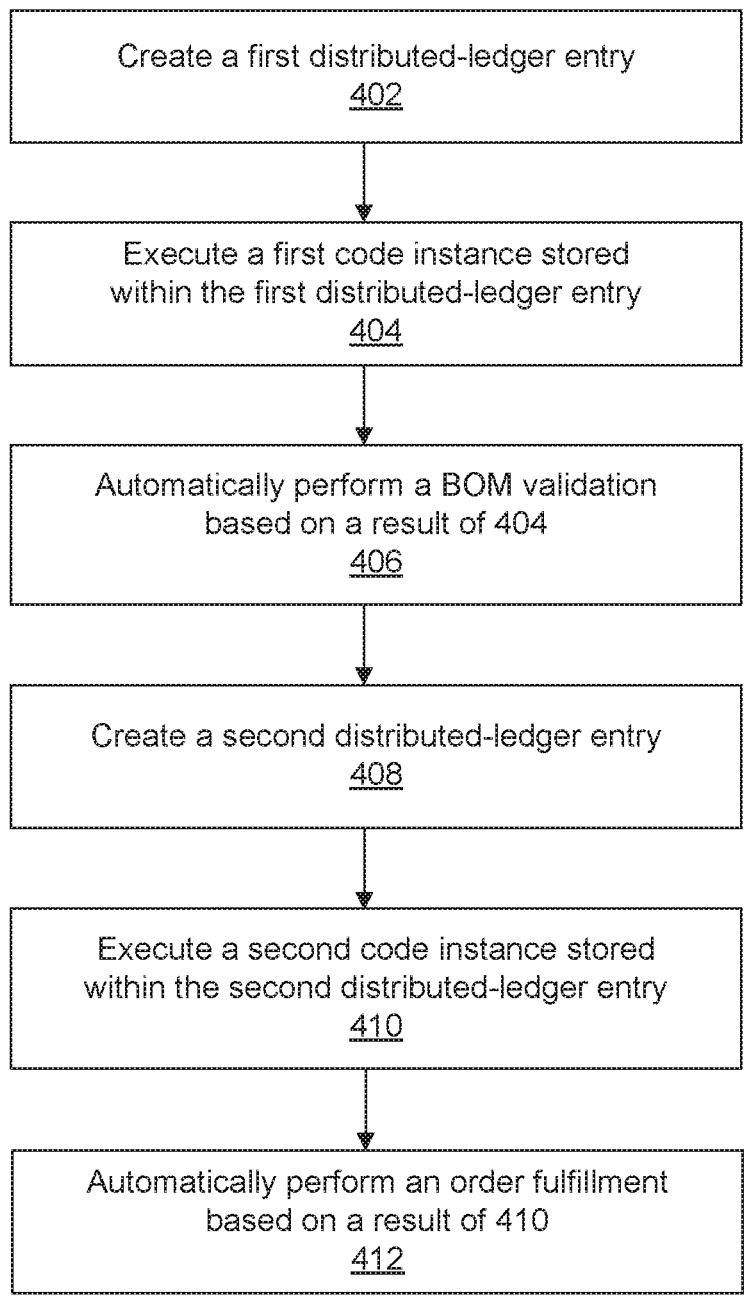
FIG. 4 is a flowchart illustrating use of some of the enhanced techniques described herein, according to some embodiments.

FIG. 4 is a flowchart illustrating a method 400 for operation of the enhanced PLM techniques described herein, according to some embodiments. Method 400 may be performed by processing logic that may comprise hardware (e.g., circuitry, dedicated logic, programmable logic, microcode, etc.), software (e.g., instructions executing on a processing device), or a combination thereof. Not all steps of method 400 may be needed in all cases to perform the enhanced techniques disclosed herein. Further, some steps of method 400 may be performed simultaneously, or in a different order from that shown in FIG. 4, as will be understood by a person of ordinary skill in the art.

Method 400 shall be described with reference to FIGS. 2, 3, and 5. However, method 400 is not limited only to those example embodiments. The steps of method 400 may be performed by at least one computer processor coupled to at least one memory device. An exemplary processor and memory device(s) are described below with respect to FIG. 5. In some embodiments, method 400 may be performed by system 100 of FIGS. 1 and 3, which may further include at least one processor and memory such as those of FIG. 5.

In 402, at least one processor 504 may be configured to create a first distributed-ledger entry in a distributed ledger. The distributed ledger may include blockchain technology, such as blockchain 300, for example. The first distributed-ledger entry may further include a first code instance that may be executed in accordance with at least part of the first distributed-ledger entry. The first code instance may include at least one of a smart contract and a chaincode, for example, or similar technology. The first code instance may additionally be executable and configured to allow partial or full execution, and/or to be self-executable, in some embodiments.

In 404, processor 504 may be configured to execute the first code instance in accordance with at least part of the first distributed-ledger entry. Specifically, based on a check for presence of a BOM, execution may proceed to any other action or transaction triggered by execution of the first code instance, such as in 406 below.

In 406, processor 504 may be configured to perform a BOM validation in response to a result of 404 above. In some embodiments, 406 may be skipped, either for failure of execution of the first code instance, or due to any other specific configuration that may render 406 optional, such as a lack of any need for specific BOM validation.

In 408, processor 504 may be configured to create a second distributed-ledger entry in the distributed ledger. The distributed ledger may include blockchain technology, such as blockchain 300, for example. The second distributed-ledger entry may further include a second code instance that may be executed in accordance with at least part of the second distributed-ledger entry. The second code instance may include at least one of a smart contract and a chaincode, for example, or similar technology. The second code instance may additionally be executable and configured to allow partial or full execution, and/or to be self-executable, in some embodiments.

In 410, processor 504 may be configured to execute the first code instance in accordance with at least part of the second distributed-ledger entry. Specifically, based on an automatic determination by processor 504 of at least one winning request or bid (winner), execution may proceed to any other action or transaction triggered by execution of the second code instance, such as in 412 below.

In 412, processor 504 may be configured to perform an order fulfillment in response to a result of 410 above. Order fulfillment includes, but is not limited to, material shipment, subassembly shipment, assembly shipment, and service commencement, to name a few examples. In some embodiments, 412 may be skipped, either for failure of execution of the second code instance, or due to any other specific configuration that may render 412 optional, such as a lack of any need for any specific order fulfillment. This lack of need may be brought about by, for example, lack of an order, cancellation of an order, etc.

Figure 5:
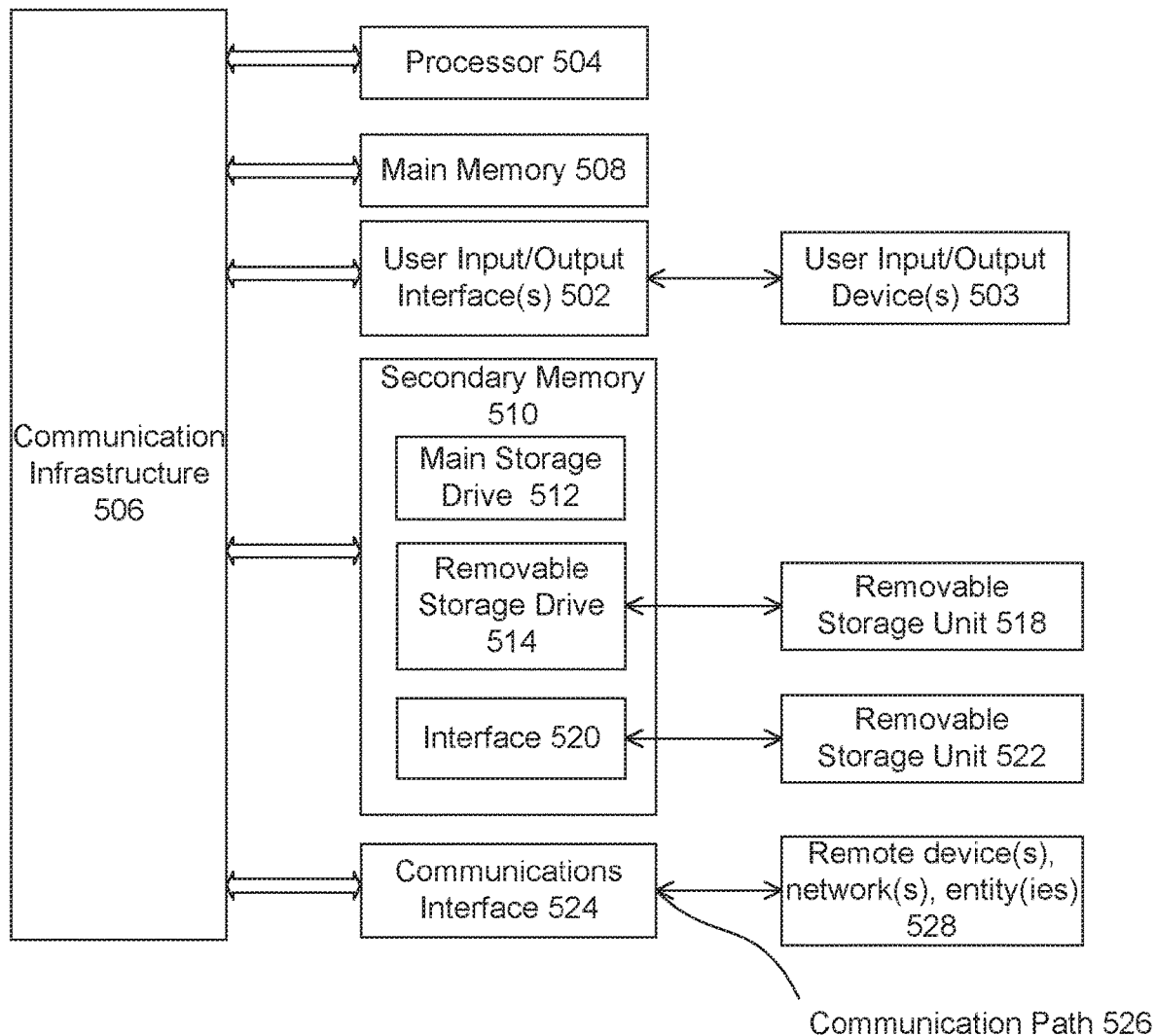
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

In other embodiments, this disclosure may be directed to other database technology in lieu of distributed ledger or blockchain technology. For example, an embodiment may include creating a first database entry in a database. The entry may include at least part of a list of items received from an external system. The entry may further include at least one first code instance configured to be executed in accordance with at least part of the first database entry.

Further to this embodiment, the first code instance may be executed in accordance with the at least part of the first database entry. Based on a result of the executing this first code instance, at least one computer processor such as processor 504 may automatically perform a validation of the list of items. Additionally, processor 504 may create a second database entry, which may include at least part of a request and at least one second code instance. The second code instance may be executed in accordance with at least part of the second database entry. Based on a result of the executing this second code instance, processor 504 may automatically perform further processing. This describes one non-limiting example—other embodiments may implement the enhanced techniques disclosed herein using equivalent technologies.

Computer system 500 may include one or more processors (also called central processing units, or CPUs), such as a processor 504. Processor 504 may be connected to a bus or communication infrastructure 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example.

Additionally, one or more of processors 504 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or secondary memory 510. Secondary memory 510 may include, for example, a main storage drive 512 and/or a removable storage device or drive 514. Main storage drive 512 may be a hard disk drive or solid-state drive, for example. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communication path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C #, Objective-C, Java, Swift, Go, Ruby, Perl, Python, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

Chaincode or smart contract terms may be encoded or programmed using at least some of the above programming languages and/or frameworks, e.g., Node.js with JavaScript, other general-purpose programming languages such as Go, and/or domain-specific languages such as Solidity, to name a few non-limiting examples. Any additional libraries, shim code, middleware, APIs, or other logic may be introduced to make smart instruments reliably executable (or self-executable) on any given target platform(s) for development, testing, staging, and/or deployment to production, according to some embodiments.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different from those described herein.

References herein to "one embodiment," "an embodiment," "an example embodiment," "some embodiments," or similar phrases, indicate that the embodiment described may include a particular feature, structure, or characteristic, but every embodiment may not necessarily include the particular feature, structure, or characteristic. Moreover, such phrases are not necessarily referring to the same embodiment.

Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

We claim:

1. A computer-implemented method, comprising:
creating, by at least one processor, in a distributed ledger, a first node comprising:
at least part of a bill of materials (BOM) received from an external system, and
at least one first chaincode instance configured to be executed in accordance with at least part of the first node;
executing, by the at least one processor, the at least one first chaincode instance in accordance with the at least part of the first node;
based on a result of the executing the at least one first chaincode instance, automatically performing a validation of the BOM, by the at least one processor;
creating, by the at least one processor, in the distributed ledger, a second node comprising:
at least part of a request, and
at least one second chaincode instance configured to be executed in accordance with at least part of the second node;
executing, by the at least one processor, the at least one second chaincode instance in accordance with the at least part of the second node; and
based on a result of the executing the at least one second chaincode instance, automatically performing further processing, by the at least one processor.

2. The computer-implemented method of claim 1, wherein the BOM comprises a list of items, a list of services, a list of manufacturers, or a combination thereof.

3. The computer-implemented method of claim 1, wherein the request is shared by parties spanning at least two tiers of a supply chain, and wherein the further processing includes an order fulfillment.

4. The computer-implemented method of claim 1, wherein the distributed ledger comprises a blockchain, and wherein the at least one first code instance or the at least one second chaincode instance comprises at least one term of a smart contract.

5. The computer-implemented method of claim 1, wherein a winner of the request is automatically determined by the external system, based on an execution result of the at least one first chaincode instance or the at least one second chaincode instance.

6. The computer-implemented method of claim 1, wherein the external system is configured to communicate with at least one logistical tracking system configured to generate a logistical data entry based at least in part on the BOM and data automatically generated from at least one mobile device.

7. The computer-implemented method of claim 6, the at least one logistical tracking system being further configured to create, by the at least one processor, in the distributed ledger, a third node, in response to at least one logistical event.

8. A system, comprising:
a memory; and
at least one processor, coupled to the memory, and configured to:
create, in a distributed ledger, a first node comprising:
at least part of a bill of materials (BOM) received from an external system, and
at least one first chaincode instance configured to be executed in accordance with at least part of the first node;
execute the at least one first chaincode instance in accordance with the at least part of the first node;
based on a result of the executing the at least one first chaincode instance, automatically perform a validation of the BOM;
create, in the distributed ledger, a second node comprising:
at least part of a request, and
at least one second chaincode instance configured to be executed in accordance with at least part of the node entry;
execute the at least one second chaincode instance in accordance with the at least part of the second node; and
based on a result of the executing the at least one second chaincode instance, automatically perform further processing.

9. The system of claim 8, wherein the BOM comprises a list of items, a list of services, a list of manufacturers, or a combination thereof.

10. The system of claim 8, wherein the request is shared by parties spanning at least two tiers of a supply chain, and wherein the further processing includes an order fulfillment.

11. The system of claim 8, wherein the distributed ledger comprises a blockchain, and wherein the at least one first code instance or the at least one second chaincode instance comprises at least one term of a smart contract.

12. The system of claim 8, wherein a winner of the request is automatically determined by the external system, based on an execution result of the at least one of first chaincode instance or the at least one second chaincode instance.

13. The system of claim 8, wherein the external system is configured to communicate with at least one logistical tracking system configured to generate a logistical data entry based at least in part on the BOM and data automatically generated from at least one mobile device.

14. The system of claim 13, the at least one logistical tracking system being further configured to create, in the distributed ledger, a third node, in response to at least one logistical event.

15. A non-transitory computer-readable storage medium having instructions stored thereon that, when executed by at least one computing device, cause the at least one computing device to perform operations comprising:
creating, in a distributed ledger, a first node comprising:
at least part of a bill of materials (BOM) received from an external system, and
at least one first chaincode instance configured to be executed in accordance with at least part of the first node;
executing the at least one first chaincode instance in accordance with the at least part of the first node;
based on a result of the executing the at least one first chaincode instance, automatically performing a validation of the BOM;
creating, in the distributed ledger, a second node comprising:
at least part of a request, and
at least one second chaincode instance configured to be executed in accordance with at least part of the second node;
executing the at least one second chaincode instance in accordance with the at least part of the second node; and
based on a result of the executing the at least one second chaincode instance, automatically performing further processing.

16. The non-transitory computer-readable storage medium of claim 15, wherein the BOM comprises a list of items, a list of services, a list of manufacturers, or a combination thereof.

17. The non-transitory computer-readable storage medium of claim 15, wherein the request is shared by parties spanning at least two tiers of a supply chain, and wherein the further processing includes an order fulfillment.

18. The non-transitory computer-readable storage medium of claim 15, wherein the distributed ledger comprises a blockchain, and wherein the at least one first code instance or the at least one second code instance comprises at least one term of a smart contract.

19. The non-transitory computer-readable storage medium of claim 15, wherein a winner of the request is automatically determined by the external system, based on an execution result of the at least one first code instance or the at least one second code instance.

20. The non-transitory computer-readable storage medium of claim 15, wherein the external system is configured to communicate with at least one logistical tracking system configured to generate a logistical data entry based at least in part on the BOM and data automatically generated from at least one mobile device.

\* \* \* \* \*